United States Patent [19]

Rieger et al.

[11] Patent Number: 5,453,475
[45] Date of Patent: Sep. 26, 1995

[54] PROCESS FOR PREPARING LOW DENSITY ETHYLENE COPOLYMERS

[75] Inventors: Bernhard Rieger, Nehren; Dieter Lilge, Limburgerhof; Kaspar Evertz, Schifferstadt; Rainer Konrad, Goennheim, all of Germany

[73] Assignee: Basf Aktiengesellschaft, Ludwigshafen, Germany

[21] Appl. No.: 261,011

[22] Filed: Jun. 14, 1994

Related U.S. Application Data

[63] Continuation of Ser. No. 981,487, Nov. 25, 1992, abandoned.

[30] Foreign Application Priority Data

Nov. 29, 1991 [DE] Germany ............... 41 39 261.2

[51] Int. Cl.$^6$ ............... C08F 4/68; C08F 4/643; C08F 210/16
[52] U.S. Cl. ............ 526/160; 526/165; 526/348; 526/348.2; 526/348.5; 526/348.6; 526/903
[58] Field of Search ............... 526/160, 348.2, 526/348.4, 903, 348.5, 165, 348.3, 348, 348.6

[56] References Cited

U.S. PATENT DOCUMENTS

| 5,086,134 | 2/1992 | Antberg et al. ............... 526/160 X |
| 5,087,677 | 2/1992 | Brekner et al. ............... 526/281 X |

FOREIGN PATENT DOCUMENTS

| 070220 | 1/1983 | European Pat. Off. . |
| 0129368 | 12/1984 | European Pat. Off. ............... 526/160 |
| 88/04672 | 6/1988 | WIPO . |

OTHER PUBLICATIONS

Hackh's Chemical Dictionary, 4th ed., McGraw–Hill, Inc., N.Y., 25 (1969).
Hackh's Chem. Dictionary, J. Grant (ed.), McGraw–Hill Book Co., N.Y., p. 31 (1969).

*Primary Examiner*—Fred Teskin
*Attorney, Agent, or Firm*—Keil & Weinkauf

[57] ABSTRACT

Low density ethylene copolymers are obtainable by adding an aromatic hydrocarbon solution of a catalyst system, containing, as active components, metallocene complexes of metals of subgroups IV and V of the Periodic Table and oligomeric alumina compounds, to a mixture containing ethylene, comonomers and aliphatic hydrocarbons.

1 Claim, No Drawings

PROCESS FOR PREPARING LOW DENSITY ETHYLENE COPOLYMERS

This application is a continuation of application Ser. No. 07/981,487, filed on Nov. 25, 1992, now abandoned.

The present invention relates to low density ethylene copolymers obtainable by adding an aromatic hydrocarbon solution of a catalyst system containing, as active components, metallocene complexes of metals of subgroups IV and V of the Periodic Table and oligomeric alumina compounds to a mixture containing ethylene, comonomers and aliphatic or alicyclic hydrocarbons.

The present invention furthermore relates to processes for the preparation of such ethylene copolymers, their use for the production of fibers, films and moldings, and the fibers, films and moldings obtainable and consisting of the ethylene copolymers.

Many material properties of ethylene copolymers are determined not only by the molecular weight and the type of comonomers but in particular by the molecular weight distribution and comonomer distribution. These include, for example, the fracture mechanics of such materials and the sticking of polyethylene films due to low molecular weight polymer fractions having a high comonomer content.

Conventional Ziegler-Natta catalysts based on carrier-supported titanium, zirconium or vanadium compounds have the disadvantage that such low molecular weight, comohomer-rich polymer chains form in the copolymerization of ethylene with $C_3$–$C_{10}$alk-1-enes. The distribution of the comonomers is inhomogeneous and dependent on the chain length, as described in EP-A 70 220. Owing to the preferential incorporation of the comohomers in the short chains, in the preparation of low density polyethylene large amounts of comohomer are required in order to ensure the incorporation of a sufficient amount thereof in the higher molecular weight product fraction.

It is true that metallocene catalyst systems can be used to produce ethylene copolymers which have a more uniform comonomer distribution, as described in WO 88/04672, but said copolymers also have a narrow molecular weight distribution, which in turn leads to poorer processibility.

It is an object of the present invention to provide low density ethylene copolymers which do not have the stated disadvantages and at the same time exhibit a good morphology.

We have found that this object is achieved by the low density ethylene copolymers defined at the outset. We have also found processes for the preparation of such ethylene copolymers, their use for the production of fibers, films and moldings and the fibers, films and moldings obtainable and consisting of the ethylene copolymers.

The aromatic hydrocarbon solutions of catalyst systems used for the preparation of the novel ethylene copolymers contain, among the active components, metallocene complexes of metals of subgroups IV and V of the Periodic Table, in particular of titania, of zirconium, of hafnium, of vanadium, of niobium or of tantalum. Preferably used complexes are those in which the metal atom is bonded via π-bonds to unsaturated cyclic hydrocarbon radicals, for example cyclopentadienyl, fluorenyl or indenyl. Furthermore, in the preferably used complexes, the metal atom may also be bonded to further ligands, in particular to fluorine, chlorine, bromine or iodine or $C_1$–$C_{10}$-alkyl, for example methyl, ethyl, propyl or butyl.

Particularly suitable metallocene complexes are of the general formula I

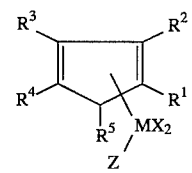

where

M is titanium, zirconium, hafnium, vanadium, niobium or tantalum,

X is fluorine, chlorine, bromine, iodine, hydrogen, $C_1$–$C_{10}$-alkyl, $C_6$–$C_{15}$-aryl or -OR$^6$, R$^6$ is $C_1$–$C_{10}$-alkyl, $C_6$–$C_{15}$-aryl, alkylaryl, arylalkyl, fluoroalkyl or fluoroaryl, where each alkyl radical is of 1 to 10 carbon atoms and each aryl radical is of 6 to 20 carbon atoms, R$^1$ to R$^5$ are each hydrogen, $C_{1-C10}$-alkyl, 5-membered to 7-membered cycloalkyl, which in turn may carry $C_1$–$C_6$-alkyl as substituent, $C_6$–$C_{15}$-aryl or arylalkyl, where two adjacent radicals together may furthermore form a cyclic group of 4 to 15 carbon atoms, or Si(R$^7$)$_3$, R$^7$ is $C_1$–$C_{10}$-alkyl, $C_6$–$C_{15}$-aryl or $C_3$–$C_{10}$-cycloalkyl, Z is X or

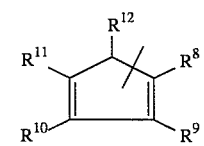

R$^8$ to R$^{12}$ are each hydrogen, $C_1$–$C_{10}$-alkyl, 5-membered to 7-membered cycloalkyl, which in turn may carry $C_1$–$C_{10}$-alkyl as a substituent, $C_6$–$C_{15}$-aryl or arylalkyl, where two adjacent radicals together may furthermore form a cyclic group of 4 to 15 carbon atoms, or Si (R$^{13}$)$_3$, R$^{13}$ is $C_1$–$C_{10}$-alkyl, $C_6$–$C_{15}$-aryl or $C_3$–$C_{10}$-cycloalkyl, or R$^4$ and Z together form a group -[Y(R$^{14}$)$_2$]$_n$-E-, Y is silicon, germanium, tin or carbon, R$^{14}$ is $C_1$–$C_{10}$-alkyl, $C_3$–$c_{10}$-cycloalkyl or $C_6$–$C_{10}$-aryl, n is 1, 2, 3 or 4,

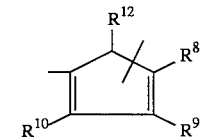

A is -O-, -S-,

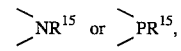

R$^{15}$ is $C_1$–$c_{10}$-alkyl, $C_6$–$C_{15}$-aryl, $C_3$–$C_{10}$-cycloalkyl, alkylaryl or Si(R$^{16}$)$_3$ and R$^{16}$ is $C_1$–$C_{10}$-alkyl, $C_{16}$–$C_{15}$-aryl, $C_3$–$C_{10}$-cycloalkyl or alkylaryl.

Among the metallocene compounds of the general formula I

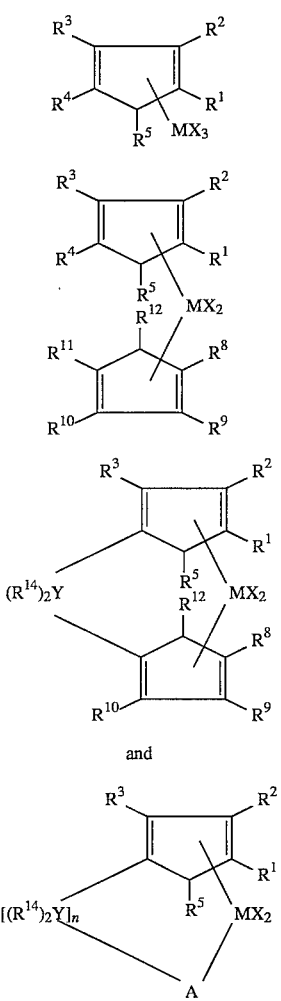

are preferred.

Thus, it is not just the bis(η-cyclopentadienyl)metal complexes which are understood under the term metallocenes.

Particularly preferred compounds of formula Ia are those in which M is titanim, zirconim or hafnium, X is chlorine and $R^1$ to $R^5$ are each hydrogen or $C_1$–$C_4$-alkyl.

Preferred compounds of the formula Ib are those in which M is zirconim or hafnium, X is chlorine, $C_1$–$C_4$-alkyl or phenyl, $R^1$ to $R^5$ are each hydrogen, $C_1$–$C_4$-alkyl or $Si(R^7)_3$ and $R^8$ to $R^{12}$ are each hydrogen, $C_1$–$C_4$-alkyl or $Si(R^{13})_3$.

Particularly suitable compounds of the formula Ib are those in which the cyclopentadienyl radicals are identical, the unsubstituted cyclopentadienyl radicals are preferred.

Examples of particularly suitable compounds includes bis(cyclopentadienyl)-zirconium dichloride, bis(pentamethylcyclopentadienyl)-zirconium dichloride, bis(cyclopentadienyl)-diphenylzirconium, bis(methylcyclopentadienyl)-zirconium dichloride, bis(ethylcyclopentadienyl)-zirconium dichloride, bis(n-butylcyclopentadienyl)-zirconium dichloride and bis(trimethylsilylcyclopentadienyl)-zirconium-dichloride and the corresponding dimethylzirconium compounds.

Particularly preferred compounds of the formula Ic are those in which $R^1$ and $R^8$ are identical and are each hydrogen or $C_1$–$C_{10}$-alkyl, $R^5$ and $R^{12}$ are identical and are each hydrogen, methyl, ethyl, isopropyl or tert-butyl, $R^3$ and $R^{10}$ are each $C_1$–$C_4$-alkyl, $R^2$ and $R^9$ are each hydrogen or two adjacent radicals $R^2$ and $R^3$ or $R^9$ and $R^{10}$ together form a cyclic group of 4 to 12 carbon atoms, $R^{14}$ is $C_1$–$C_8$-alkyl, M is zirconium or hafnium, Y is silicon, germanium, tin or carbon and X is chlorine.

Examples of particularly suitable complexes include: dimethylsilanediylbis(cyclopentadienyl)-zirconium dichloride, dimethylsilanediylbis(indenyl)-zirconium dichloride, dimethylsilanediylbis(tetrahydroindenyl)-zirconium dichloride, ethylenebis(cyclopentadienyl)-zirconium dichloride, ethylenebis(indenyl)-zirconium dichloride, ethylenebis(tetrahydroindenyl)-zirconium dichloride, dimethylethylene-9-fluorenylcyclopentadienyl zirconium dichloride, dimethylsilanediylbis(3-tert-butyl-5-methylcyclopentadienyl) -zirconium dichloride, dimethyls ilanediylbis(3-tert-butyl-5-ethylcyclopentadienyl) -zirconium dichloride, dimethyls ilanediylbis(3-tert-butyl-5-methylcyclopentadienyl) -dimethylzirconium, dimethylsilanediylbis(2-methylindenyl)-zirconium dichloride, dimethylsilanediylbis(2-isopropylindenyl)-zirconium dichloride, dimethylsilanediylbis(2-tert-butylindenyl)-zirconium dichloride, diethylsilanediylbis(2-methylindenyl)-zirconium dibromide, dimethylsilanediylbis(2-methyl-5-methylcyclopentadienyl)zirconium dichloride, dimethyls ilanediylbis(2-ethyl-5-isopropylcyclopentadienyl) -zirconium dichloride, dimethylsilanediylbis(2-methylindenyl)-zirconium dichloride, dimethylsilanediylbis(2 -methylbenzindenyl)-zirconium dichloride and dimethylsilanediylbis(2-methylindenyl)-hafnium dichloride.

Examples of particularly preferred compounds of the general formula Id are those in which M is zirconium or hafnium, X is chlorine or $C_1$–$C_{10}$-alkyl, Y is silicon or carbon when n is 1 or is carbon when n is 2, $R^{14}$ is $C_1$–$C_8$-alkyl, $C_5$–$C_6$-cycloalkyl or $C_6$–$C_{10}$-aryl, A is -O-, -S- or >$NR^{15}$ and $R^1$ to $R^3$ and $R^5$ are each hydrogen, $C_1$–$C_{10}$-alkyl, $C_3$–$C_{10}$-cycloalkyl, $C_6$–$C_{15}$-aryl or $Si(R^7)_3$, or two adjacent radicals form a cyclic group of 4 to 12 carbon atoms.

The synthesis of such complexes can be carried out by conventional methods, the reaction of the correspondingly substituted, cyclic hydrocarbon anions with halides of titanium, zirconium, hafnium, vanadium, niobium or tantalum being preferred. Examples of corresponding preparation processes are described in, inter alia, Journal of Organometallic Chemistry, 369 (1989), 359–370.

The metallocene complexes may also be in cationic form, as described in EP-A 277 003 and EP-A 277 004. μ-Oxo-bis(chlorobiscyclopentadienyl)zirconiummay also be used as a metallocene complex.

In addition to the metallocene complexes, the catalyst systems used for the preparation of the novel ethylene copolymers also contain oligomeric alumina compounds. For example, open-chain or cyclic alumoxane compounds of the general formula II or III

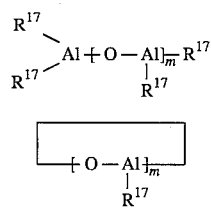

where $R^{17}$ is $C_1$–$C_4$-alkyl, preferably methyl or ethyl, and m is an integer from 5 to 30, preferably from 10 to 25, are suitable.

The preparation of these oligomeric alumoxane compounds is usually carried out by reacting a solution of trialkylaluminum with water and is described in, inter alia, EP-A 284 708 and US-A 4 794 096.

As a rule, the oligomeric alumoxane compounds obtained are present in the form of mixtures of both linear and cyclic chain molecules of different lengths, so that m should be regarded as an average value. The alumoxane compounds may also be present as a mixture with other metal alkyls, preferably with alkylaluminums.

It has proven advantageous to use the complex of metals of subgroups IV and V of the Periodic Table and the oligomeric alumoxane compound in amounts such that the atomic ratio of aluminum from the oligomeric alumoxane compound to the transition metal from the complex of metals of subgroups IV and V of the Periodic Table is from 10:1 to $10^6:1$, in particular from 10:1 to $10^{4:1}$.

Conventional aromatic hydrocarbons, preferably of 6 to 20 carbon atoms, in particular xylenes and toluene, and mixtures thereof, are used as solvents for these catalyst systems.

The aromatic hydrocarbon solutions of these catalyst systems are then added to a mixture containing ethylene, comonomers and aliphatic or alicyclic hydrocarbons. The catalyst system may be added all at once, a little at a time or continuously to the polymerization mixture.

Preferred comonomers are $C_3$–$C_{10}$-alk-1-enes and cyclic alkenes which have no hydrocarbon radicals as substituents at the double bond, in particular propene, but-1-ene, pent-1-ene, hex-1-ene and cyclopentene. These comonomers can be used individually or as mixtures.

Suitable aliphatic or alicyclic hydrocarbons are those in which the catalyst systems are usually soluble to an extent of less than 5 g/l under the reaction conditions. $C_4$–$C_{15}$-Alkanes, in particular isobutane, n-hexane and nheptane, have proven preferable, as well as $C_5$–$C_{15}$-cycloalkanes, in particular cyclopentane and cyclohexane, and highly substituted alkenes, ie. alkenes having at least one substituent at the double bond which is not terminal, for example 2,3-dimethylbut-2-ene and 1-methylcyclohexene, and diesel oil, liquid paraffin and gasoline. However, $C_4$–$C_5$-alkanes are particularly preferred. Mixtures of different aliphatic or alicyclic hydrocarbons may also be used.

The amount of comohomers is usually from 1 to 25% by weight, preferably from 3 to 15, % by weight, based on ethylene.

These copolymers can be prepared, either batchwise or preferably continuously, in the conventional reactors used for the polymerization of alkenes. Suitable reactors include continuously operated stirred kettles, and a plurality of stirred kettles connected in series may also be used.

The polymerization conditions as such are not critical, pressures of from i to 1,000 bar and temperatures of from −50° to +300° C. usually being employed.

In a preferred embodiment, the comonomers and aliphatic hydrocarbons are initially taken under an inert gas atmosphere, the solution is heated to 50°–100° C. and the pressure is brought to 1–100 bar with ethylene. The catalyst system is injected, preferably under superatmospheric pressure by means of an inert gas, into this mixture while stirring.

The ethylene copolymers are obtained as granular polymers which can be readily isolated by the conventional methods, such as evaporation of the aliphatic hydrocarbons.

The density of the resulting products is in general from 0.890 to 0.945, preferably from 0.910 to 0.930, g/cm$^3$.

The novel ethylene copolymers have a good morphology, a uniform comonomer distribution and an advantageous molecular weight distribution, with the result that they can be readily processed.

The novel low density ethylene copolymers are suitable for the production of fibers, films and moldings.

EXAMPLES

Preparation of low density ethylene/hex-1-ene copolymers

EXAMPLES 1 TO 3

500 ml of heptane and various amounts of hex-1-ene were initially taken in a 1 l autoclave. The solution was heated to 60° C. and the pressure was brought to 15 bar with ethylene. 10 ml of a toluene solution which contained 1.6 mg ($5.5 \cdot 10^{-6}$ mol) of bis(cyclopentadienyl)zirconiumdichloride and 1 g ($19 \cdot 10^{-3}$ mol Al) of methylalumoxane was injected into this mixture while stirring under superatmospheric pressure by means of an inert gas. Reaction for 30 minutes gave a granular ethylene/hex-1-ene copolymer which was suspended in heptane. No wall deposits occurred during the polymerization. 80% of the copolymer had a particle size of from 250 to 500 μm.

The amounts of hex-1-ene used, the yields, the activity of the catalyst systems and the properties of the ethylene/hex-1-ene copolymers are summarized in the Table.

The viscosities η were determined according to DIN 53,733, the density d was determined for pressed sheets according to ASTM D-792, the weight average molecular weight $\bar{M}_w$ and the number average molecular weight $\bar{M}_n$ were determined by gel permeation chromatography, the melting point $T_m$ was determined by defined cooling of the melt (20° C./min) and reheating, the hex-1-ene content was determined by means of $^{13}$C-NMR and the bulk density was determined according to DIN 53,468.

TABLE

| Example | Hex-1-ene [ml] | Yield [g] | Activity [kg of copolymer/ mol of Zr] | η [dl/g] | d [g/cm$^3$] | $\bar{M}_w$ [g/mol] | $\bar{M}_w:\bar{M}_n$ | $T_m$ [°C.] | Hex-1-ene content [% by wt.] | Bulk density [g/l] |
|---|---|---|---|---|---|---|---|---|---|---|
| 1 | 30 | 87.1 | 15,840 | 2.41 | 0.930 | 250,000 | 4.45 | 120.1 | 3.3 | 210 |
| 2 | 50 | 92.0 | 16,730 | 2.21 | 0.920 | 169,000 | 4.32 | 116.5 | 5.1 | 198 |
| 3 | 70 | 98.5 | 17,910 | 1.90 | 0.916 | 145,000 | 4.75 | 111.9 | 6.8 | 225 |

We claim:

1. A process for preparing a low density ethylene copolymer which comprises: adding an aromatic hydrocarbon solution of a catalyst system containing, as active components, metallocene complexes of metals of subgroups IV and V of the Periodic Table and oligomeric alumoxane compounds to a mixture containing ethylene, $C_3$–$C_{10}$-alk-1-enes and aliphatic or alicyclic hydrocarbons.

* * * * *